W. V. TURNER.
ELECTROPNEUMATIC BRAKE.
APPLICATION FILED JUNE 5, 1918.
1,316,207.
Patented Sept. 16, 1919.
2 SHEETS—SHEET 2.
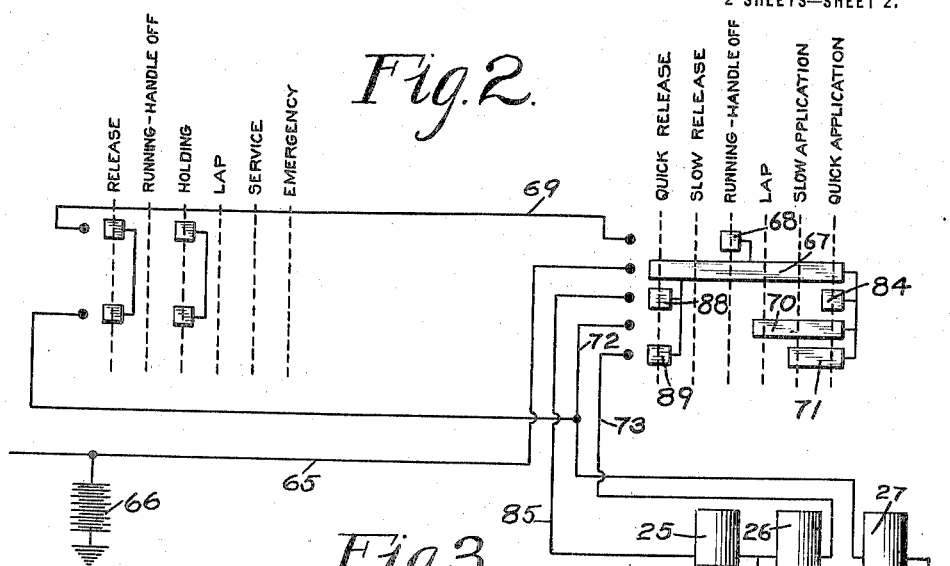
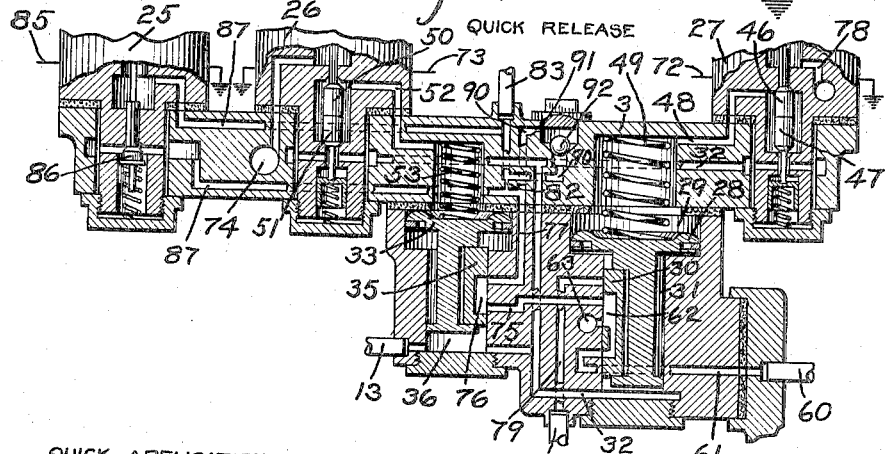
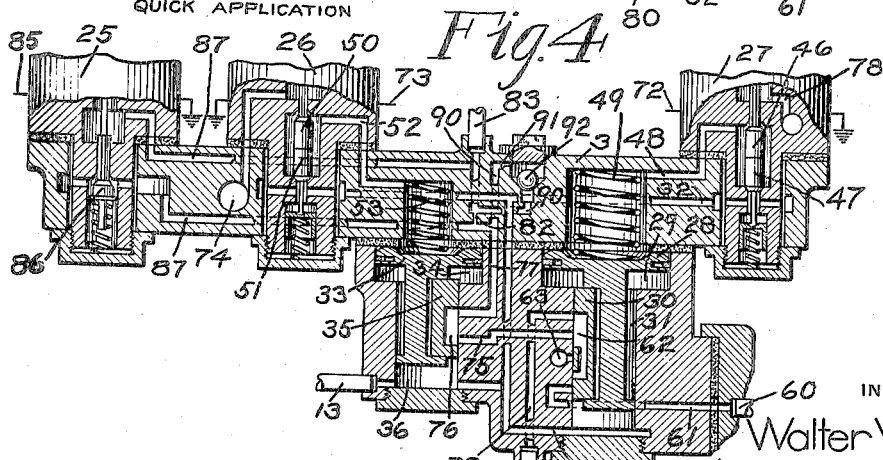
INVENTOR
Walter V. Turner
by Wm. M. Cady
Att'y.

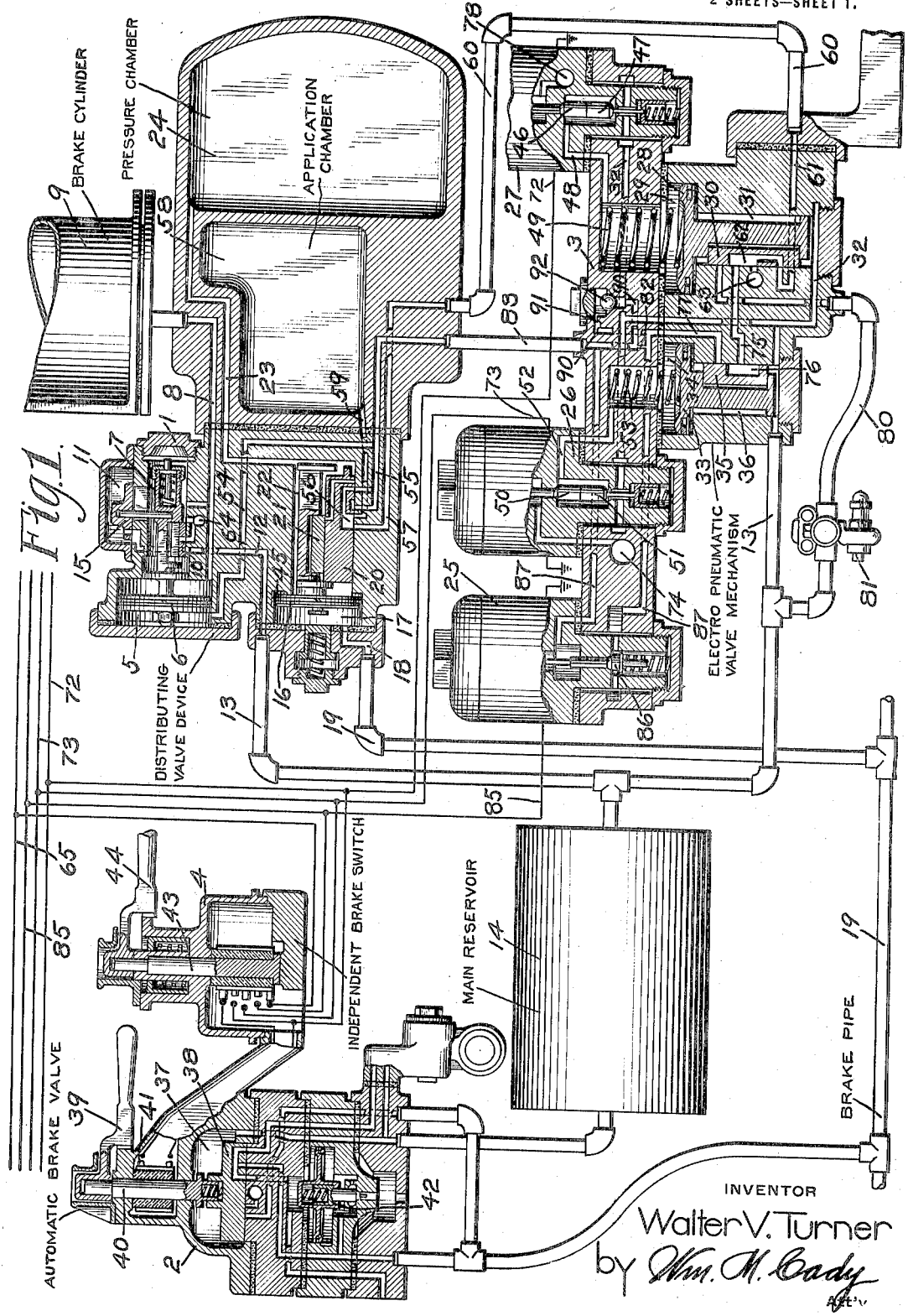

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,316,207.　　　　　　　Specification of Letters Patent.　　Patented Sept. 16, 1919.

Application filed June 5, 1918. Serial No. 238,279.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to electropneumatic brakes, and more particularly to an electropneumatic brake equipment for locomotives.

It has heretofore been proposed to provide a locomotive brake equipment in which the brakes can be applied automatically by the manipulation of an automatic brake valve to effect a reduction in brake pipe pressure, or the brakes can be applied independently on the locomotive by operating an independent brake valve to effect a direct increase in pressure in the socalled application chamber of a distributing valve device.

With an equipment of the above character, the independent control of the brakes on the locomotive therefore has the characteristics of a direct or straight air brake and while ordinarily this would not be objectionable, where there are brake controlling valves located at some distance from each other, as on the larger locomotives, or in double heading, the response to operation of the independent brake valve is apt to lack the desired promptness and uniformity of braking action, such as is obtained with the automatic brake, due to the longer time interval required to transmit fluid pressure variations through a straight air or independent pipe, where the pipe is of considerable length.

One object of my invention is to overcome the above difficulty, by providing an electro-responsive equipment for controlling the brakes independently on the locomotive.

Another object of my invention is to provide an electro-pneumatic brake device in which a plurality of electro-responsive devices are so correlated that a large number of braking functions can be obtained with the use of a smaller number of electro-responsive devices.

Other objects and advantages will appear in the following more detailed description of the invention.

In the accompanying drawings; Figure 1 is a diagrammatic sectional view of a locomotive brake equipment embodying my invention; Fig. 2 is a wiring diagram of the circuits for electrically controlling the above equipment; Fig. 3 a sectional view of the electro-responsive portion of the equipment, showing the parts in quick release position; and Fig. 4 a similar view, showing the parts in quick application position.

As shown in the drawings, the equipment may comprise a distributing valve device 1, an automatic brake valve 2, an electro-pneumatic valve mechanism 3, and an independent brake switch device 4.

The distributing valve device 1 may comprise a casing having a piston chamber 5 containing an application piston 6, a valve chamber 7, connected by passage 8 to brake cylinder 9, and containing a release slide valve 10, and a valve chamber 11, connected by passage 12 and pipe 13 to main reservoir 14, and containing an application slide valve 15.

For controlling the operation of piston 6 and the valves 10 and 15, by fluid pressure automatically, an equalizing valve device is provided comprising a piston 16 contained in piston chamber 17, which is connected by passage 18 with an automatic brake pipe 19 and a main slide valve 20 and an auxiliary slide valve 21 contained in valve chamber 22, which is connected by passage 23 with pressure chamber 24.

The electro-pneumatic valve mechanism 3 may comprise electro-responsive devices 25, 26, and 27, and a valve device having a piston 28, contained in piston chamber 29, the fluid pressure in which is controlled by the electro-responsive device 27, and a valve 30, adapted to be operated by piston 28 and contained in brake chamber 31, which is connected by passage 32 with the main reservoir pipe 13.

The electro-responsive device 26 controls the operation of a valve device comprising a piston 33 contained in piston chamber 34 and a slide valve 35 contained in valve chamber 36, which is connected to main reservoir pipe 13.

The automatic brake valve 2 may comprise a casing having a valve chamber 37 containing a rotary valve 38 adapted to be operated by a handle 39 and secured to the valve stem 40 is a contact device 41 for controlling certain electric circuits leading to the independent brake switch 4. The brake valve device also includes the usual equalizing discharge valve mechanism 42 for controlling the venting of fluid from the brake pipe to effect an application of the brakes.

The independent brake switch device 4 comprises a stem 43 carrying contacts for controlling the various electric circuits of the electro-pneumatic valve mechanism and a handle 44 for operating said stem.

In operation, the brake pipe 19 is normally charged with fluid under pressure from the automatic brake valve 2 in the usual manner, and fluid flows from the brake pipe to piston chamber 17 of the equalizing valve device. Thence, through groove 45, the valve chamber 22 and the pressure chamber 24 is charged.

Fluid from the main reservoir 14 flows through pipe 13 and passage 32, charging the valve chambers 36 and 31. Normally the electro-responsive devices 25, 26, and 27 are deënergized and with the magnet of the device 27 deënergized, the double beat valve is operated so that valve 46 is seated and valve 47 opened to admit fluid from main reservoir passage 32 to passage 48, leading to piston chamber 29.

Fluid pressures on opposite sides of piston 28 being now balanced, the spring 49 maintains the piston 28 at its inner position.

The deënergization of the magnet of device 26 operates the double beat valve thereof, so that valve 50 is closed and valve 51 is opened to admit fluid from main reservoir passage 32 through passage 52 to piston chamber 34.

The fluid pressures on opposite sides of piston 33 are thus equalized, so that spring 53 maintains piston 33 at its inner position, as shown in Fig. 1 of the drawings.

In the release position of the equalizing slide valve 20, the piston chamber 5 is connected through passages 54 and 55 and cavity 56 with exhaust passage 57 and application chamber 58 is also connected through passage 59 and cavity 56 with said exhaust passage.

The exhaust passage 57 is connected through pipe 60, passage 61, and cavity 62, in slide valve 30, with exhaust port 63, so that piston chamber 5 being at atmospheric pressure, the release valve 10 is operated by piston 6 to connect valve chamber 7 and the brake cylinder 9 with exhaust port 64.

Both the automatic brake valve handle 39 and the independent brake switch handle 44 are normally maintained in their running positions, in which the automatic brake valve operates in the usual manner to maintain the brake pipe pressure at the standard carried in the system and the independent brake switch opens all circuits, except that supply wire 65, connected to a grounded source of current 66 is connected through contacts 67 and 68 with a wire 69 leading to the automatic brake valve.

The independent brake switch is preferably provided with six positions as follows: Quick release, slow release, running and handle off, lap, slow application, and quick application.

If it is desired to effect a slow application of the brakes on the locomotive, the independent brake switch is turned to slow application position, in which contacts 67, 70, and 71 connect the supply wire 65 with wires 72 and 73, leading respectively to the electro-responsive devices 27 and 26.

The magnets of the devices 26 and 27 are then energized, so that valve 51 is seated to cut off the supply of fluid from the main reservoir to piston chamber 34, while the valve 50 is opened to vent fluid from said piston chamber to exhaust port 74. The piston 33 is thereupon operated by fluid pressure in valve chamber 36 so as to shift the valve 35 to connect passage 75, through cavity 76, with passage 77. The energization of the magnet of device 27 operates to close valve 47 and open valve 46, so that fluid is vented from piston chamber 29 to exhaust port 78. Piston 28 then operates valve 30, so as to blank the exhaust passage 61 from the equalizing slide valve 20 and connect passage 75, through cavity 62, with passage 79, which is supplied with fluid under pressure through pipe 80 from the reducing valve device 81, connected to the main reservoir pipe 13.

Fluid will now be supplied to application piston chamber 5, through passage 79, cavity 62 in slide valve 30, passage 75, cavity 76 in slide valve 35, passage 77, which is connected, through a restricted portion 82 and pipe 83, with passage 55 and thence through passage 54 to piston chamber 5.

Passage 55 being connected in the release position of the equalizing slide valve 20, through cavity 56, with the application chamber 58, a slow flow of fluid is effected to the application chamber 58 as well as the application piston chamber 5, as determined by the restricted port 82, and application piston 6 then operates to close the exhaust valve 10 and open the valve 15 for supplying fluid to the brake cylinder 9 in the usual manner.

If it is desired to effect an independent quick application of the brakes on the locomotive, the independent brake switch is turned to quick application position, in which the magnet of the electro-responsive device 25 is energized through contact 84 and wire 85, as well as the magnets of devices 26 and 27.

The energization of the electro-responsive device 25 operates to open a valve 86, which then establishes connection through a bypass passage 87, around the restricted port 82, as shown in Fig. 4 of the drawings.

It will now be seen, that fluid under pressure is supplied to the application piston chamber 5 as in making a slow application of the brakes, hereinbefore described, but since fluid can now flow through the large by-pass passage 87, a quick application of the brakes is secured.

A quick release of the brakes may be secured by turning the brake switch to quick release position, in which the magnets of electro-responsive devices 25 and 26 are energized through contacts 88 and 89.

As shown in Fig. 3 of the drawings, the piston 28 remains in normal position, while piston 33 is operated to shift slide valve 35 so as to connect passages 75 and 77, and valve 86 opens communication through by-pass passage 87. Fluid under pressure is thereupon quickly released from the application piston chamber 5 through pipe 83, by-pass passage 87, passage 77, cavity 76 in slide valve 35, passage 75, cavity 62 in slide valve 30, to exhaust port 63.

The release of fluid under pressure from piston chamber 5, causes the movement of the application piston 6 to release position, so that the brakes are released.

If it is desired to effect the slow release of the brakes on the locomotive, the independent brake switch is turned to slow release position, in which all of the electro-responsive devices are deënergized.

The piston 28 having been shifted to release position by the deënergization of the electro-responsive device 27, the cavity 62 in valve 30 connects passage 61 with exhaust port 63, so that fluid is vented from the application piston chamber 5 and the application chamber 58 through the usual exhaust passage 57 of the equalizing valve device.

In order to provide means for exhausting fluid in releasing the brakes at a different rate from that obtained in applying the brakes, an additional by-pass passage 90 may be provided having a restricted port 91 which may be adjusted to give the desired additional flow. A check valve 92 is interposed in this passage to prevent flow therethrough in applying the brakes.

In applying the brakes, if it is desired to hold the brakes applied at a given pressure, when such pressure has been obtained, the brake switch may be turned to lap position, in which the electro-responsive devices 25 and 26 are deënergized, while the device 27 remains energized.

The deënergization of electro-responsive device 26 operates the double beat valve so as to close the valve 50 and open valve 51. Fluid from the main reservoir is then supplied to piston chamber 34, so that piston 33 is shifted to its inner position, cutting off connection between passages 75 and 77. It will now be evident that further supply of fluid to the application piston chamber 5 is prevented.

In a similar manner, the release of the brakes may be graded down by moving the switch brake to lap position, when the desired reduction in pressure in the locomotive brake cylinders has been obtained.

The electro-responsive device 27 may be said to control the application and release of the brakes, the electro-responsive device 26, the holding of the brakes applied or partially released at a given pressure, and the electro-responsive device 25, the quick application and release of the brakes.

It will thus be seen that with three electro-responsive devices, six braking positions are provided, namely, quick release, slow release, running, lap, slow application, and quick application.

In order that the brakes on the locomotive may be held applied when the automatic brake valve is moved to release position to release the train brakes, or when the automatic brake valve is moved to holding position, contacts are provided in said brake valve for connecting the current supply to the electro-responsive device 27 in said positions, so that the exhaust passage 57 will be cut off from the exhaust port 63 by the movement of the piston 28 and the slide valve 30, and thus the release of the locomotive brakes prevented, when the equalizing piston 16 is shifted to release position by the increase in brake pipe pressure occasioned in shifting the automatic brake valve to release or holding positions.

Having now described my invention, what I claim as new and desire to secure by Letters Patent, is:

1. The combination with an automatic fluid pressure brake on the locomotive, of electro-responsive devices for controlling the brakes on the locomotive independently of the train brakes and an independent brake switch for controlling said electro-responsive devices.

2. The combination with a brake valve and a valve device adapted to be controlled by said brake valve, for controlling the brakes on the locomotive, of electro-responsive devices for independently controlling the brakes on the locomotive, and an independent brake switch for controlling said electro-responsive devices.

3. The combination with an automatic fluid pressure brake system for controlling the brakes on the locomotive and train, of electro-responsive devices on the locomotive for controlling the locomotive brakes independently of the train brakes and an independent brake switch for controlling the circuits of said electro-responsive devices.

4. The combination with an electro-responsive device for controlling the supply and exhaust of fluid under pressure for effecting the control of the brakes, of an electro-responsive device adapted to close communication through which said supply and exhaust of fluid under pressure is effected.

5. The combination with an electro-responsive device for controlling the supply and exhaust of fluid under pressure for effecting the control of the brakes, of an electro-responsive device for normally establishing communication through which said supply and exhaust of fluid under pressure is effected and operative to close said communication.

6. The combination with a valve device operated by variations in pressure in an application chamber for controlling the brakes, of an electro-responsive device for controlling the supply and release of fluid under pressure to and from said chamber and an electro-responsive device operative to effect the closure of communication through which fluid is supplied and released.

7. The combination with an electro-responsive device for supplying fluid through a restricted port for effecting an application of the brakes, of an electro-responsive device for opening a by-pass passage around said restricted port.

8. The combination with an electro-responsive device for supplying fluid through a restricted port to effect an application of the brakes, of an electro-responsive device adapted to be operated for closing connection through which fluid is supplied, and an electro-responsive device for controlling a by-pass passage around said restricted port.

9. The combination with an electro-responsive device for supplying and releasing fluid through a restricted port for effecting the application and release of the brakes, of an electro-responsive device adapted to be operated for opening a by-pass passage around said restricted port.

10. The combination with a brake pipe and an equalizing valve device operated by variations in brake pipe pressure for controlling the application and release of the brakes, of an electro-responsive device for controlling the exhaust from the equalizing valve device, an independent brake switch for controlling the circuit of said electro-responsive device, and an automatic brake valve for effecting variations in brake pipe pressure and adapted to also control the circuit of said electro-responsive device.

11. The combination with a brake pipe and an equalizing device, operated by variations in brake pipe pressure for controlling the application and release of the brakes, of an electro-responsive device for controlling the exhaust from the equalizing valve device, an independent brake switch for controlling the circuit of said electro-responsive device, and an automatic brake valve adapted to control the circuit of said electro-responsive device in release and holding positions.

12. The combination with a brake pipe, a distributing valve device for controlling the locomotive brakes, and an automatic brake valve for varying the brake pipe pressure to control the train brakes and for controlling the action of said distributing valve device, of an electro-pneumatic valve mechanism for also controlling said distributing valve device and an independent brake switch for controlling said electro-pneumatic valve mechanism.

13. A combined automatic and independent brake apparatus comprising means on the locomotive and train for controlling the brakes automatically, an automatic brake valve for controlling said means, an electro-pneumatic valve mechanism for controlling the brakes on the locomotive independently of the brakes on the train, and an independent brake switch for controlling said electro-pneumatic valve mechanism.

14. A combined automatic and independent brake apparatus, comprising a brake pipe, a distributing valve device having an application valve device operated by an increase in pressure in an application chamber for supplying fluid to the locomotive brake cylinder, and an equalizing valve device operated upon a reduction in brake pipe pressure for supplying fluid to said application chamber for applying the brakes on the locomotive independently of the brakes on the train.

In testimony whereof I have hereunto set my hand.

WALTER V. TURNER.